Aug. 25, 1925.  
J. SLEPIAN  
1,551,270  
PHASE BALANCING SYSTEM  
Filed June 10, 1922  
2 Sheets-Sheet 1

WITNESSES:  
C. M. Cochran  
O. B. Buchanan

INVENTOR  
Joseph Slepian.  
BY  
Wesley G. Carr  
ATTORNEY

INVENTOR
Joseph Slepian.

Patented Aug. 25, 1925.

1,551,270

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

PHASE-BALANCING SYSTEM.

Application filed June 10, 1922. Serial No. 567,450.

*To all whom it may concern:*

Be it known that I, JOSEPH SLEPIAN, a citizen of the United States, and a resident of Swissvale, in the county of Allegheny and State of Pennsylvania, have invented a new and useful Improvement in Phase-Balancing Systems, of which the following is a specification.

My invention relates to phase-balancing systems, and in particular to such systems employing transformer means or other means which do not have the power to store up the necessary energy for equalizing the pulsating power demands of an unbalanced single-phase load in a polyphase system.

With voltage regulating means of the class described, for instance, a plurality of single-phase induction regulators, it is possible to balance either the voltage vector or the current vector of an unbalanced line although usually at the expense of the other vector, and it is a purpose of my invention to provide a system wherein such balance may be obtained.

One object of my invention is to provide a system in which the polyphase electrical quantity to be balanced is maintained in balanced condition by the aid of induction regulators controlled by relays responsive to the respective delta phases of such quantity.

A more specific object of my invention is to provide a balancing system including a plurality of single-phase induction regulators whereby the voltages will be balanced on either the load side or the supply side of the induction regulators.

A further object of my invention is to provide a balancing system in which the major portion of the balancing operation is performed by a shunt-connected balancing machine and the unbalancing effect of the internal impedance drops in the shunt machine are neutralized by means of serially connected voltage regulators which may be separately regulated for constant line voltages.

With these and other objects in view, my invention consists in the methods and apparatus pointed out in the following description and illustrated in the accompanying drawing wherein, Figure 1 is a diagrammatic view showing circuits and apparatus embodying my invention in a voltage-balancing system.

In the following description, I shall employ the capital letters A, B, C, with distinguishing subscripts, to designate delta-connected elements, and the small letters $a$, $b$, $c$ to indicate the star connection.

Figure 1:
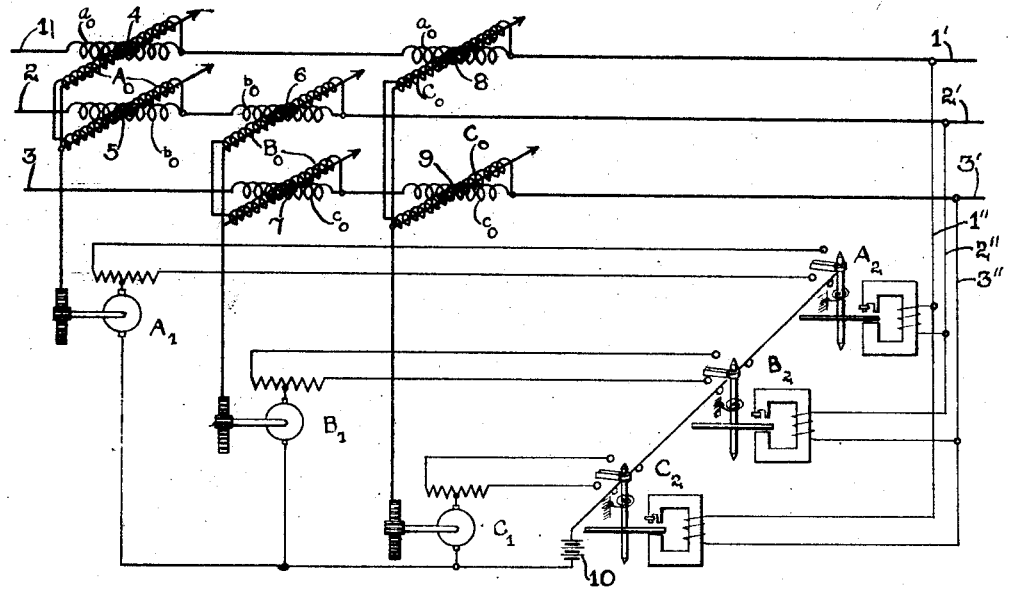

In Fig. 1 is shown a polyphase line 1—1', 2—2', 3—3', which may receive power from either end and transmit the same to an unbalanced load connected at the other end. In order to correct the unbalancing of the voltage resulting from the unbalanced load currents, I provide six single-phase induction regulators, 4, 5, 6, 7, 8 and 9, each having a voltage coil and a current coil. The regulators 4 and 5 have their voltage coils $A_0$ $A_0$ connected in series across the phase 1—2, their current coils $a_0$ $b_0$ being connected in series with the lines 1 and 2 respectively. In like manner, the regulators 6 and 7 have their voltage coils $B_0$ $B_0$ connected in series across the lines 2—3, the corresponding current coils $b_0$ $c_0$ being connected in series with the lines 2 and 3, respectively. In like manner also, the regulators 8 and 9 have their voltage coils $C_0$ $C_0$ connected in series across the lines 1—3, with their corresponding current coils $a_0$ $c_0$ connected in series with the lines 1 and 3 respectively.

The regulators are mechanically connected together, in pairs corresponding to the voltage connections, for simultaneous operation by means of small regulating motors $A_1$ $B_1$ $C_1$, the regulators of each pair being so connected that maximum voltage is generated in both regulators at the same time. The regulating motors are driven in the one direction or the other in accordance with the relative magnitudes of the voltages at the terminal 1' 2' 3' of the line by means of relays $A_2$ $B_2$ $C_2$. The relays are illustrated in Fig. 1 as being of the induction-meter type and are connected to the line conductors 1'—2'—3' by means of conductors 1"—2"—3". The relays are adjusted to maintain the respective delta phases of the line voltages at the same constant value, whereby it will be apparent that an equilateral triangle of electromotive forces is produced which assures a balanced phase relationship. If the voltage becomes too high or too low in any phase the regulating motor of the corresponding pair of voltage regulators is operated, in one direction or the other, until the desired voltage value has been obtained, energy for the regulating motors $A_1$—$B_1$—$C_1$ being supplied, through the respective relays $A_2$—$B_2$—$C_2$, from a battery or other source 10.

While I have shown a particular type of relay for controlling the regulating motors, it is of course evident that any other control system may be adopted.

Figure 2:
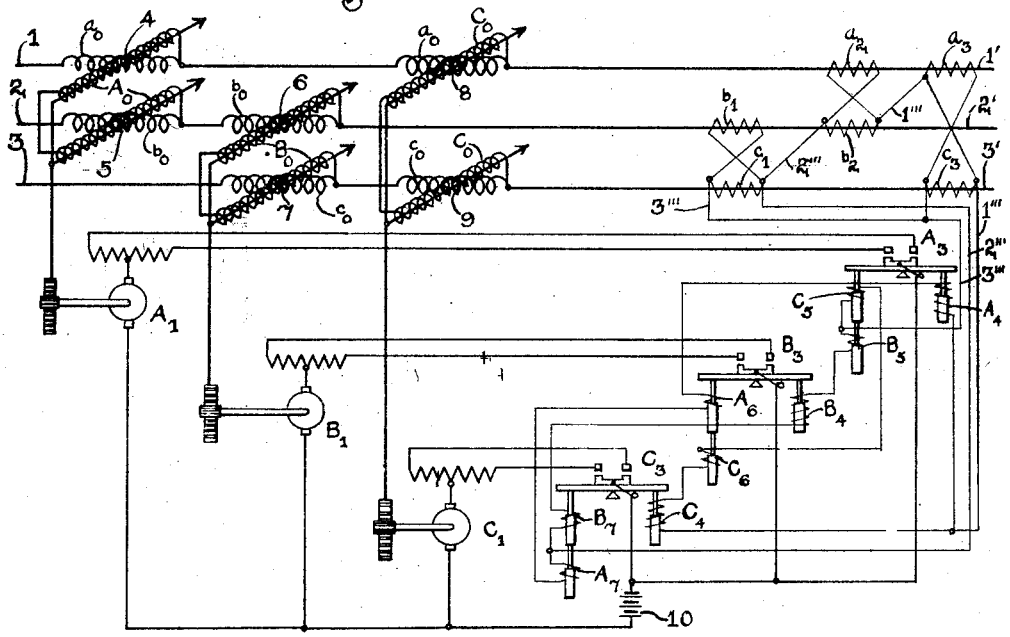
Fig. 2 is a similar view showing a modification embodying a current-balancing system.

In Fig. 2, the same induction regulators, with their regulating motors, are shown associated with a control system of a modified type which is responsive to the respective delta currents of the line. Voltages proportional to the respective delta currents of the lines $1'$—$2'$—$3'$ are obtained by means of three pairs of parallel connected current transformers $b_1$ $c_1$, $a_2$ $b_2$, and $a_3$ $c_3$, said pairs being connected in delta by means of conductors $1'''$—$2'''$—$3'''$.

To maintain the delta currents in a balanced condition, it is necessary to make each of the respective delta phase currents equal in magnitude to one-half of the arithmetical sum of the other two delta phase components. In order to accomplish this, I have provided a plurality of relays $A_3$ $B_3$ $C_3$ of the rocking-arm type having, at one end of the rocking arms, current coils $A_4$ $B_4$ $C_4$, respectively, and, at the other end of each rocking arm, two current coils $C_5$ $B_5$, $A_6$ $C_6$ and $B_7$ $A_7$, respectively. It will be understood that each of the current coils is associated with a solenoid or plunger mechanism connected to the corresponding rocking arm, and that the single coils $A_4$ $B_4$ $C_4$ have a larger number of turns than the other coils, whereby the forces developed in the single coils are twice as large as the forces developed in any of the other coils when the currents are equal. Corresponding current coils may be connected in series and energized from the respective lines $1'''$—$2'''$—$3'''$. A pair of contacts on each of the rocking arms serve to energize the regulating motors $A_1$ $B_1$ $C_1$, respectively, in accordance with the actuation of the rocking arms.

It will thus be seen that the apparatus shown in Fig. 2 automatically regulates the line for balanced currents, causing the voltages applied to the unbalanced load to be unbalanced sufficiently to cause the load to draw the desired balanced currents.

Figures 3, 4:
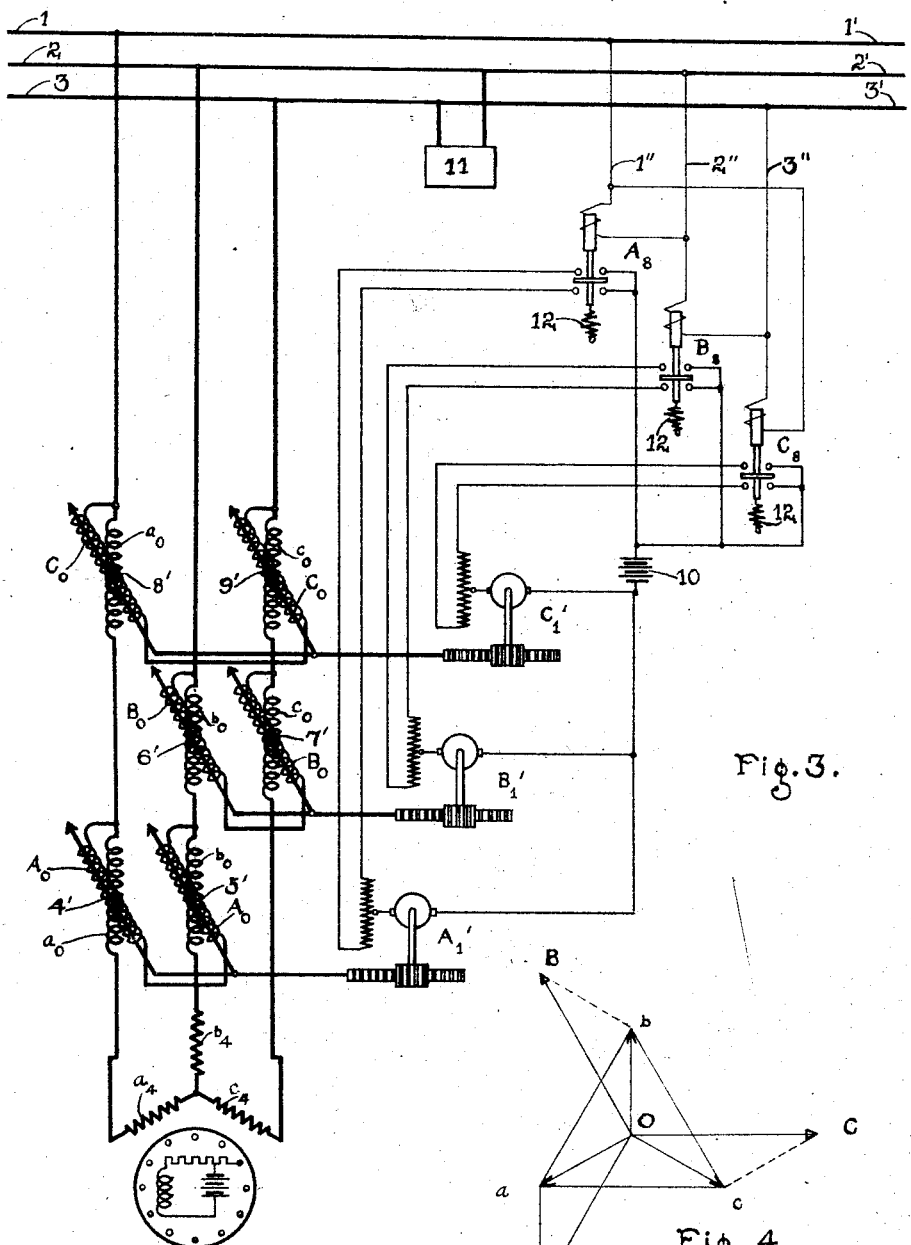
Fig. 3 is a similar view illustrating my invention employing auxiliary balancing apparatus in connection with an ordinary shunt balancing machine.
Fig. 4 is a vector diagram to which reference will be made in the explanation of the invention.

In Fig. 3, I have shown my invention applied to perfect the operation of the ordinary shunt balancer machine having primary windings $a_4$ $b_4$ $c_4$ connected to the line 1, 2, 3, the unbalancing load being symbolized by a single-phase load 11. A plurality of single-phase induction regulators numbered $4'$ to $9'$ are associated with the conductors connecting the phase balancer to the line in a manner similar to that described in connection with Fig. 1, the regulators being mechanically connected in pairs to be energized by a plurality of small regulating motors $A_1'$, $B_1'$, $C_1'$.

In the arrangement shown in Fig. 3, it will thus be seen that the induction regulators will be called upon to supply voltages only large enough to compensate for the unbalancing effect of the internal impedance drops in the shunt-phase balancer machine, and hence the induction regulators may be of relatively small size. The adjustment of the regulators may be effected by means of a plurality of electromagnetic relays $A_8$ $B_8$ $C_8$ pulling against springs 12 and energizing either one of a pair of reversing contacts according to the departure of the corresponding line voltage from a predetermined value, such contacts being connected to the respective regulating motors as shown.

The above-described systems are reversible in the sense that the power may be supplied either from the terminal 1—2—3 or from the terminal $1'$—$2'$—$3'$ of the line, the unbalanced load being supplied by the other terminal, according as it is desired to maintain balanced vectors in the load or in the source. In the balanced-current regulating system shown in Fig. 2, however, if the energy is supplied, by a balanced constant-voltage source, to the line terminal $1'$—$2'$—$3'$, it will be noted that the supply current and the supply voltage will both be balanced. Hence, in the particular case just mentioned, the supply energy is balanced and the system will therefore operate to so unbalance the load voltages as to cause the energy consumption to be balanced notwithstanding the unbalanced impedances of the load devices. In every other instance, in the three embodiments illustrated, there may be an energy unbalance in the unbalanced load. My systems are further reversible in the sense that the source may be unbalanced and the load balanced.

The operation of my system will be more readily understood by reference to Fig. 4 in which are shown the star currents $Oa$, $Ob$ and $Oc$, flowing in the lines 1, 2 and 3, and the delta voltages indicated as vectors $OA$, $OB$ and $OC$, respectively. It will be noted that the star current $Oa$ may be combined with the reversed current $bO$ to produce the vector $OA$, and similarly for the other phases. The vector $OA$, therefore, represents not only the voltage in the coils $A_0A_0$ but also the resultant of the currents in the coils $a_0$ and $b_0$, and it will be noted that the resultant current and voltage vectors are in phase one with another. In this manner it is possible to derive a voltage from the current coils and supply it to boost the voltage in the corresponding phase, or conversely, to derive current from the voltage coils to boost the current in the corresponding phases.

My invention has the advantage of effecting a balance either of currents or of voltages, without resort to expensive rotating machines. While I have shown the invention in several preferred forms, it will be understood by those skilled in the art that changes in the construction and application of the principles described may be resorted to without departing from my invention, and I desire, therefore, that the appended claims shall be constructed to cover all such modifications as are fairly comprehended by the language thereof when read in the light of the prior art.

I claim as my invention:

1. The combination with a polyphase line subject to unbalanced conditions, of a plurality of single-phase voltage-regulator booster mechanisms serially connected thereto and voltage-responsive means for independently regulating said mechanisms.

2. The combination with a three-phase line subject to unbalanced conditions, of a plurality of single-phase voltage-regulator booster mechanisms serially connected thereto and voltage-responsive means for independently regulating said mechanisms.

3. The combination with a polyphase line subject to unbalanced conditions, of a plurality of single-phase induction-regulator mechanism including voltage windings associated in delta connection therewith and electro-responsive means for independently regulating said mechanisms.

4. The combination with a three-phase line subject to unbalanced conditions, of three single-phase voltage-regulator booster mechanisms including windings connected in delta thereto and electro-responsive means for independently regulating said mechanisms.

5. The combination with a polyphase line subject to unbalanced conditions, of a plurality of single-phase induction-regulator mechanisms including voltage windings connected in mesh across adjacent phases of said line and electro-responsive means for independently regulating said mechanisms.

6. The combination with a polyphase line subject to unbalanced conditions, of a plurality of single-phase voltage-regulator booster mechanisms serially connected thereto and electro-responsive means including voltage coils energized from delta line voltages for independently regulating said mechanisms for constant line voltages.

7. The combination with a three-phase line subject to unbalanced conditions, of a plurality of single-phase voltage-regulator booster mechanisms serially connected thereto and voltage-responsive means for independently regulating said mechanisms for constant line voltages.

8. The combination with a polyphase line subject to unbalanced conditions, of a plurality of single-phase induction-regulator mechanisms including voltage windings associated in delta connection therewith and electro-responsive means for independently regulating said mechanisms for constant line voltages.

9. The combination with a three-phase line subject to unbalanced conditions, of three single-phase voltage-regulator booster mechanisms including windings connected in delta thereto and electro-responsive means for independently regulating said mechanisms for constant line voltages.

10. The combination with a polyphase line subject to unbalanced conditions, of a plurality of single-phase induction-regulator mechanisms including voltage windings connected in mesh across adjacent phases of said line and electro-responsive means for independently regulating said mechanisms for constant line voltages.

11. The combination with a polyphase line subject to unbalanced conditions, of a plurality of single-phase voltage-regulator booster mechanisms serially connected thereto and voltage-responsive means for independently regulating said mechanisms for equal line voltages.

12. The combination with a three-phase line subject to unbalanced conditions, of a plurality of single-phase voltage-regulator booster mechanisms serially connected thereto and voltage-responsive means for independently regulating said mechanisms for equal line voltages.

13. The combination with a three-phase line subject to unbalanced conditions, of three single-phase voltage-regulator booster mechanisms including windings connected in delta thereto and electro-responsive means for independently regulating said mechanisms for equal line voltages.

14. The combination with a polyphase line subject to unbalanced conditions, of a plurality of single-phase induction-regulator mechanisms including voltage windings connected in mesh across adjacent phases of said lines and electro-responsive means for independently regulating said mechanisms for equal line voltages.

15. The combination with an unbalanced polyphase line, of balancing means for balancing an electrical quantity therein, said means including an induction-regulator mechanism associated with each phase of three line-conductors of said line, and voltage-responsive means for independently regulating said mechanisms for constant line voltages.

16. The combination with an unbalanced polyphase line, of balancing means for balancing an electrical quantity therein, said means including an induction-regulator mechanism associated with each phase of three line-conductors of said line, and electro-responsive means for so controlling said mechanism as to maintain a substantial equality in the relative magnitudes of the three delta phases of a polyphase electrical quantity of said three line-conductors.

17. The combination with a dissymmetrical polyphase line, of a plurality of induction-regulator mechanisms connected in a plurality of the phases thereof, and means operable upon a departure, from a condition of substantial proportionality, of the respective delta phases of a polyphase electrical quantity of three line-conductors of said line for controlling the respective induction-regulator mechanisms.

18. The combination with an unbalanced three-phase line, of a plurality of induction-regulator mechanisms connected in a plurality of the phases thereof and electro-responsive means for so controlling said mechanisms as to maintain a substantial equality in magnitude between the three delta phases of a polyphase electrical quantity of said line.

19. The combination with an unbalanced three-phase line, of a plurality of induction-regulator mechanisms connected in a plurality of the phases thereof and means responsive to a departure of the respective delta phase voltages of said line from predetermined equal values for controlling the respective induction-regulator mechanisms.

20. The combination with an unbalanced three-phase line, of an induction-regulator mechanism associated with each phase thereof, and electro-responsive means for so controlling said mechanisms as to maintain a substantial equality in the relative magnitudes of the three delta phases of a polyphase electrical quantity of said line.

21. The combination with an unbalanced three-phase line, of an induction-regulator mechanism associated with each phase thereof, and means responsive to a departure of the single-phase delta voltages of said line from predetermined equal values for controlling the respective induction regulator mechanisms.

22. The combination with a polyphase line subject to unbalanced conditions, of a plurality of single-phase voltage-regulator mechanisms, connecting means associating said mechanisms with said line, a shunt phase-balancer machine serially associated with said connecting means, and electro-responsive means for independently regulating said mechanisms for constant line voltages.

23. The combination with a three-phase line subject to unbalanced conditions, of a plurality of single-phase voltage-regulator mechanisms, connecting means associating said mechanisms with said line, a shunt phase-balancer machine serially associated with said connecting means, and electro-responsive means for independently regulating said mechanisms for constant line voltages.

24. The combination with a three-phase line subject to unbalanced conditions, of three single-phase voltage-regulator mechanisms, connecting means associating said mechanisms with said line, a shunt phase-balancer machine serially associated with said connecting means, and electro-responsive means for independently regulating said mechanisms for constant single-phase line voltages across the delta phases.

25. In a phase-balancing system, the combination with a polyphase line subject to unbalanced conditions, of a plurality of single-phase voltage-regulator mechanisms including windings connected in shunt to said line, and a balancing device connected in series to said mechanisms in shunt to said line and offering a relatively high impedance to symmetrical three-phase currents of one phase-sequence and a relatively low impedance to symmetrical polyphase currents of another phase-sequence.

26. In a phase-balancing system, the combination with a three-phase line subject to unbalanced conditions, of a plurality of single-phase voltage-regulator mechanisms including windings connected in shunt to said line, and a balancing device connected in series to said mechanisms in shunt to said line and offering a relatively high impedance to symmetrical three-phase currents of one phase-sequence and a relatively low impedance to symmetrical three-phase currents of another phase-sequence.

27. In a phase-balancing system, the combination with a three-phase line subject to unbalanced conditions, of three single-phase induction-regulator mechanisms including windings connected in shunt to said line, a balancing device connected in series to said mechanisms in shunt to said line and offering a relatively high impedance to symmetrical three-phase currents of one phase-sequence and a relatively low impedance to symmetrical three-phase currents of another phase-sequence, and electro-responsive means for so controlling said mechanisms as to maintain a substantial equality in magnitude between the three delta phases of a three-phase electrical quantity of said line.

28. In a phase-balancing system, the combination with a three-phase line subject to unbalanced conditions, of three single-phase induction-regulator mechanisms including windings connected in shunt to said line, a balancing device connected in series to said mechanisms in shunt to said line and offering a relatively high impedance to symmetrical three-phase currents of one phase-sequence and a relatively low impedance to symmetrical three-phase currents of another phase-sequence, and means responsive to a departure of the respective delta-phase voltages of said line from predetermined equal values for controlling the respective induction-regulator mechanisms.

29. The combination with a three-phase system including three line-conductors, of a plurality of induction regulators therefor grouped in pairs, means for simultaneously operating the two regulators in each of said pairs, the induction regulators of said pairs having a pair of voltage windings and a pair of current windings, means for connecting one of said pairs of windings in one phase and means for connecting the windings of said other pair in two different phases.

30. Apparatus for maintaining a predetermined relationship between the three single-phase components of a delta polyphase electrical quantity in three line-conductors of a polyphase line at the expense of a distortion in the relationship between the single-phase components of a second polyphase electrical quantity therein, said apparatus comprising six induction regulators grouped in pairs, means for simultaneously operating the two regulators in each of said pairs, means for connecting said pairs of induction regulators in different phases of said three line-conductors with one winding of each regulator in any one pair connected in one phase of one of said quantities and the two other windings in said pair connected in two different phases of the other of said quantities, and electro-responsive means for adjusting each pair of regulators to correct departures of its corresponding single-phase component from its predetermined relationship with the other single-phase components of said first-mentioned quantity.

In testimony whereof, I have hereunto subscribed my name this 3rd day of June, 1922.

JOSEPH SLEPIAN.